G. SHELTON.
AUTOMATIC CYLINDER COCK.
APPLICATION FILED JULY 7, 1915.

1,195,106.

Patented Aug. 15, 1916.

Inventor
George Shelton.

Witnesses

By Victor J. Evans
Attorney

UNITED STATES PATENT OFFICE.

GEORGE SHELTON, OF PADUCAH, KENTUCKY.

AUTOMATIC CYLINDER-COCK.

1,195,106.  Specification of Letters Patent.  Patented Aug. 15, 1916.

Application filed July 7, 1915. Serial No. 38,458.

*To all whom it may concern:*

Be it known that I, GEORGE SHELTON, a citizen of the United States, residing at Paducah, in the county of McCracken and State of Kentucky, have invented new and useful Improvements in Automatic Cylinder-Cocks, of which the following is a specification.

This invention relates to automatic cylinder cocks being especially designed for use in connection with the cylinders of steam engines and particularly the cylinders of locomotive engines.

The object of the present invention is to produce a cylinder cock which controls the outlet of water of condensation from both ends of a steam cylinder, the said cylinder cock operating automatically so that the steam pressure admitted thereto from one end of the cylinder serves to easily and gradually close one of the valve faces or valves while opening the other valve face or valve to permit the water of condensation to be ejected from the adjacent end of the cylinder on one of the working strokes of the piston.

With the above and other objects in view, the invention consists in the novel construction, combination and arrangement of parts, as herein described, illustrated and claimed.

Figure 1:
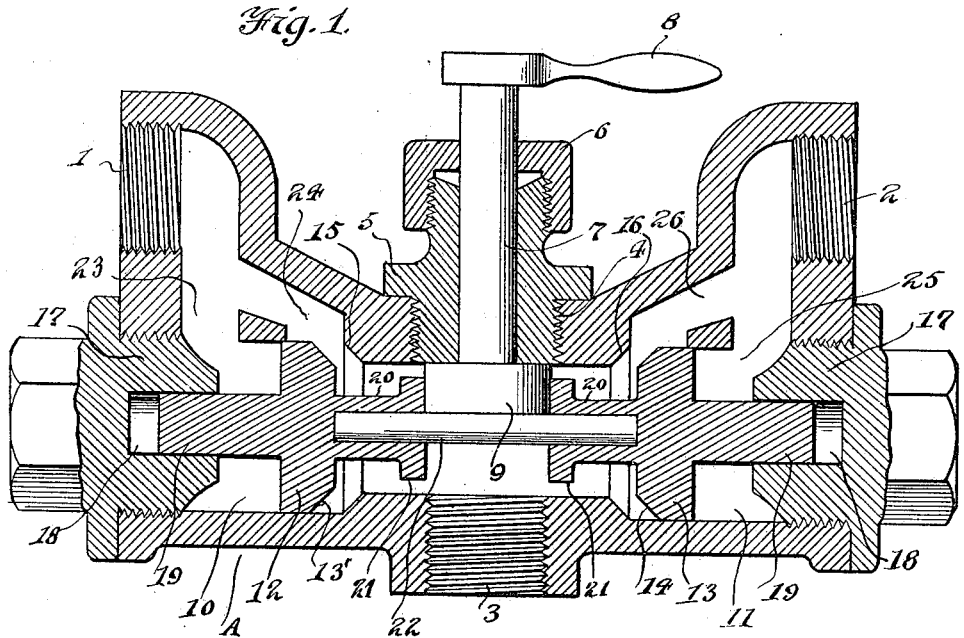
Figure 2:
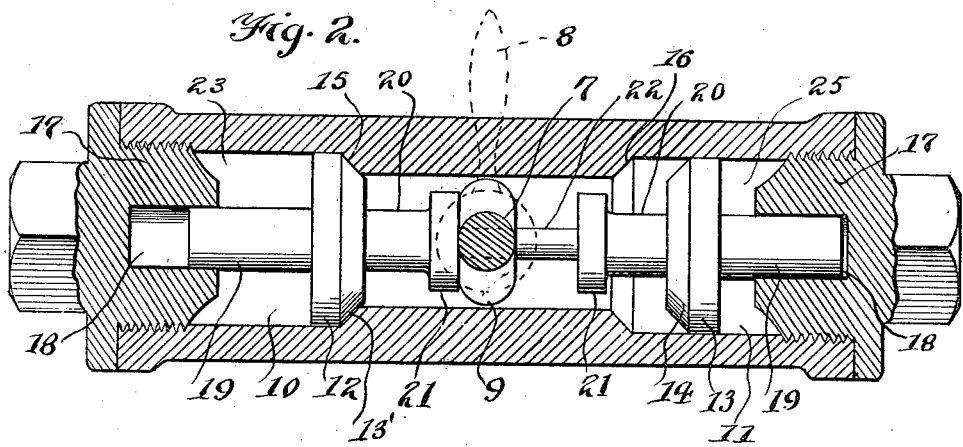

In the accompanying drawings:—Figure 1 is a vertical longitudinal section through an automatic cylinder cock embodying the present invention. Fig. 2 is a section through the same taken at right angles to Fig. 1 to illustrate the relation between the valves and valve positioning head of the operating stem.

The body of the cylinder cock designated generally at A comprises the two inlets 1 and 2 which are shown as internally threaded to receive pipes leading therefrom to the opposite ends of the cylinder of a steam engine. The body A also comprises an outlet 3 which is also shown as internally threaded to receive a drain pipe. In line with the opening 3, the body A is provided with another opening 4 which is internally threaded to receive a stuffing box 5 the same being threaded to receive a gland 6, the parts 5 and 6 being bored to receive a stem 7 on the outer or upper end of which is fastened an operating handle 8. At its lower end the stem 7 is provided with a relatively large head 9 elongated in one direction as shown in Fig. 2, the purpose of which will hereinafter appear. The body A is also formed with two valve chambers 10 and 11 in which are mounted to reciprocate a pair of valves 12 and 13 shown as formed with beveled working faces 13′ and 14 working in conjunction with correspondingly shaped valve seats 15 and 16. Plugs 17 are inserted into the threaded openings in the opposite ends of the body A and are provided with guide ways 18 in which are received the slidable stems 19 of the valves 12 and 13. The valves 12 and 13 are provided with extensions 20 facing each other as shown in Fig. 1 and formed with enlarged heads 21 which lie at opposite sides of the head 9 of the stem 7. The valves are connected together by means of a pin 22 whereby both valves are caused to move simultaneously and equally in the same direction.

The inlet 1 is bifurcated to provide two branches 23 and 24 for the purpose of admitting steam to opposite sides of the valve 12 for the purpose of balancing said valve. In like manner the inlet 2 is bifurcated to provide branches 25 and 26 for the same purpose as the branches 23 and 24.

The operation of the cylinder cock is as follows: In one working stroke of the piston, the steam at one side of the piston enters the inlet opening 1 and presses the valve 12 slowly against its seat 15 and through the medium of the pin 22, moves the valve 13 simultaneously away from its seat 16, allowing the water of condensation on the exhaust side of the piston to pass through the inlet 2 and out through the drain outlet 3. During the opposite working stroke of the piston, the steam enters the inlet 2 and presses the valve 13 against its seat, thereby, through the medium of the pin 22 moving the valve 12 away from its seat and allowing the water of condensation to enter the inlet 1 and pass outwardly through the outlet 3. When the handle 8 of the stem 7 is turned to a position in line with the pipes which connect with the inlets 1 and 2, the head 9 of the stem 7 holds both of the valves open and prevents them from moving. By turning the handle 8 through an arc of ninety degrees or at right angles to the position shown in Fig. 1, the head 9 extends in such a position as not to interfere with the movement of the valves 12 and 13 thereby permitting the latter to operate automatically in the manner above specified.

Having thus described my invention, I claim:—

An automatic cylinder cock of the character specified, comprising a body having two inlets and a single outlet, said body being recessed to provide a pair of opposed valve chambers each having a valve seat, a valve mounted in each of said chambers, a pin connecting said valves, whereby one valve is adapted to actuate the other valve and cause both valves to move simultaneously in the same direction, each of the inlets being bifurcated to provide branches leading to opposite sides of the valve body working in the adjacent valve chamber, valve guiding stems extending from the rear faces of the valve bodies, and plugs threaded into the outer end walls of the valve chambers and formed with guide ways in which said valve stems are slidable, said plugs providing for the insertion and removal of the connected valves.

In testimony whereof I affix my signature in presence of two witnesses.

GEORGE SHELTON.

Witnesses:
H. E. SHELTON,
B. H. RASCHE.

Copies of this patent may be obtained for five cents each, by addressing the "Commissioner of Patents, Washington, D. C."